UNITED STATES PATENT OFFICE.

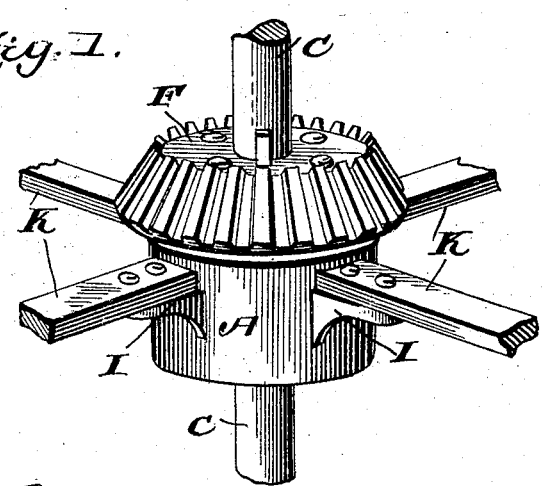
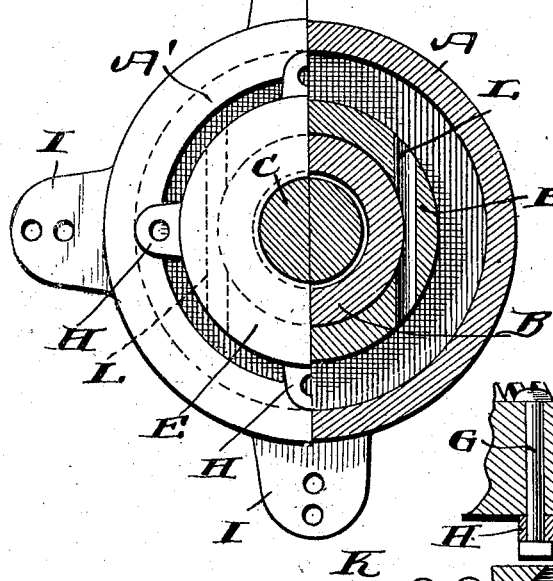
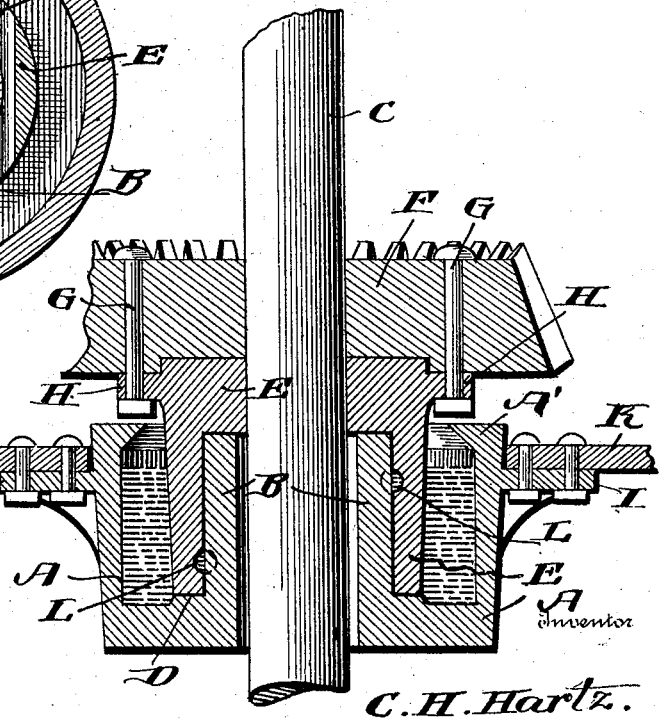

CHARLES H. HARTZ, OF DURANT, IOWA.

OIL-CUP AND BEARING.

No. 806,410.   Specification of Letters Patent.   Patented Dec. 5, 1905.

Application filed May 12, 1904. Serial No. 207,621.

*To all whom it may concern:*

Be it known that I, CHARLES H. HARTZ, a citizen of the United States, residing at Durant, in the county of Cedar and State of Iowa, have invented a new and useful Improvement in Oil-Cups and Bearings, of which the following is a specification.

This invention is an improved construction of oil-cup and bearing particularly adapted for use in connection with vertical shafts.

The object of the invention is to provide a cup and bearing with a journal adapted to turn upon said bearing, said journal carrying the shaft which turns freely within the bearing, the object being to entirely avoid friction from the shaft proper.

While my invention is especially adapted for use in connection with windmills, it will of course be understood that it will be used for other purposes equally as well.

Broadly speaking, the invention consists of a cup having a central cylindrical bearing, said cup being adapted to receive the lubricating material and a journal cylindrical also in form and fitting over the bearing, the lower end of said journal resting upon the bottom of the cup and the top of said journal resting upon the top of the bearing, said journal having a shaft passing therethrough and keyed thereto, said journal having one or more passages arranged tangential to the bearing, whereby lubricant is supplied to the said bearing.

The invention consists also in certain details of construction and novelties of combination, all of which will be fully described hereinafter and pointed out in the claim.

In the drawings forming a part of this specification, Figure 1 is a perspective view showing the practical application of my invention. Fig. 2 is a sectional plan view of the device. Fig. 3 is a vertical longitudinal section.

In carrying out my invention I employ an oil-cup A, which may be of any desired size, preferably circular in shape and formed with an inwardly-projecting flange A' at the top for the purpose of preventing oil being easily thrown out of the cup. The bottom of the cup is formed with an upwardly-projecting cylindrical bearing B, which is preferably tubular in form, as shown, to permit the passage of the vertical shaft C. The bearing B is surrounded at its lower end by means of an annular step D, which projects a slight distance above the bottom of the cup and upon which rests the lower end of the journal E, cylindrical also in form and fitting and turning upon the bearing B, said journal being closed at its upper end, said closed end resting upon the upper end of the bearing B. The shaft C also passes through this journal and is keyed to a power-transmitting disk F, which is rigidly connected to the journal by means of bolts G, passing through the laterally-projecting ears H, which are integral with the journal E. In the drawings I have represented the power-transmitting disk F as a beveled gear; but it will be understood that a pulley may be employed or other form of gear. The cup is also provided with laterally-projecting ears I, to which the supporting-arms K are attached and by means of which the oil-cup is supported in its proper position.

In order to freely supply the bearing with lubricant, I provide the journal with two passages L, which pass therethrough parallel to each other, one of said passages being arranged adjacent the upper end of the journal and the other adjacent the lower end, the center of each passage being tangential to the outer surface of the bearing B. Thus it will be seen that as the journal rotates upon the bearing the oil is fed freely through the passages, and consequently the bearing is abundantly supplied with lubricant.

It will be noted that there is no friction upon the shaft proper, as said shaft is keyed either to the journal or the gear, and said journal turns freely upon bearing, and owing to the peculiar shape of said bearing and journal and the relative location of said parts the shaft is always held in a true vertical position.

Having thus fully described my invention, what I claim as new, and desire to secure by Letters Patent, is—

The combination with an oil-cup having laterally-projecting ears and the inwardly-projecting flange, of a centrally-arranged upwardly-projecting cylindrical bearing having an annular step at its lower end, a cylindrical journal closed at its upper end and provided with laterally-projecting ears and having parallel oil-passages, a shaft passing through the bearing and journal, and a power-transmitting disk rigidly connected to the journal, said disk, journal and shaft being adapted to turn together, as set forth.

CHARLES H. HARTZ.

Witnesses:
GEO. F. HARTZ,
D. H. SNOKE.